UNITED STATES PATENT OFFICE 2,075,101

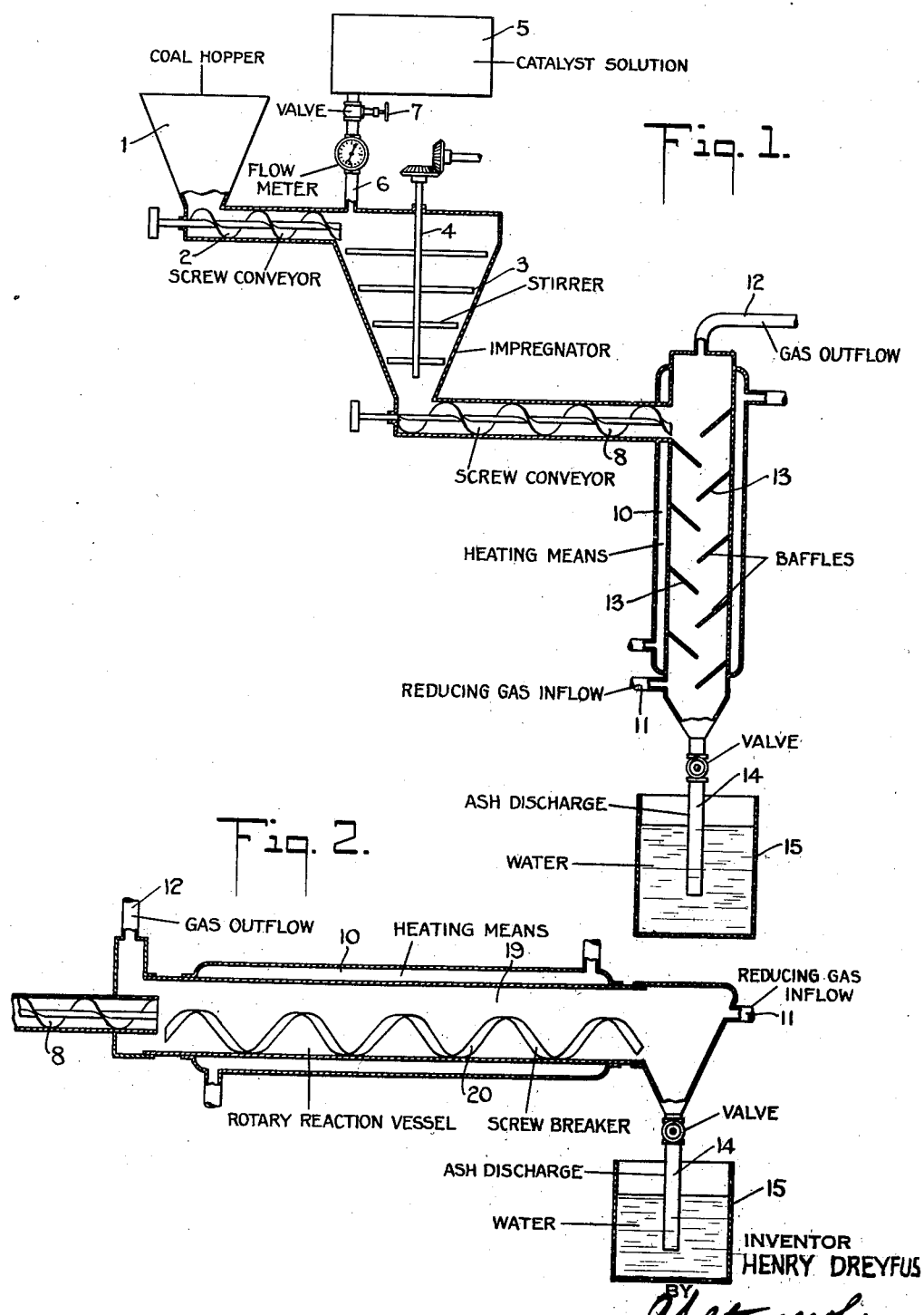

TREATMENT OF CARBONACEOUS MATERIALS WITH REDUCING GASES

Henry Dreyfus, London, England

Application January 9, 1934, Serial No. 705,900
In Great Britain February 24, 1933

6 Claims. (Cl. 196—53)

This invention relates to improvements in the treatment of carbonaceous materials with reducing gases, and particularly to the production of hydrocarbon oils and other substances by treating coal and the like with hydrogen or other reducing gases.

I have found that hydrocarbon oils and other substances may be produced in a very satisfactory manner by subjecting carbonaceous materials such as coal to the action of hydrogen or other reducing gases in the presence of a catalyst comprising an oxy-acid of phosphorus or a salt thereof, and especially in the presence of a catalyst comprising a phosphoric acid or a phosphate.

A very convenient method of carrying the invention into effect is to impregnate the coal, which is preferably first finely pulverized or powdered, with an aqueous solution of a phosphate or phosphoric acid, for example with aqueous orthophosphoric acid, or with solutions of ammonium, sodium or calcium orthophosphates, or with solutions comprising more than one such compound.

In the accompanying drawing in which similar reference numerals refer to similar parts in the several views—

Fig. 1 is a diagrammatic showing of one form of apparatus suitable for carrying out the present invention.

Fig. 2 is an alternative form of the heating or reaction chamber which may be used in place of the vertical reaction chamber shown in Fig. 1.

In Fig. 1 powdered coal from the hopper 1 is fed to the screw conveyor 2 which delivers the coal to the mixing or impregnating chamber 3, the latter being provided with a stirrer 4. Associated with the impregnating chamber 3 is a tank or reservoir 5 which contains the catalyst solution with which the coal is to be impregnated. The tank 5 is preferably located above the impregnating chamber 3 and is connected therewith by means of a pipe 6 provided with a valve 7 and a flow meter, the pipe 6 being so arranged that the catalyst solution is deposited on the coal as it is dropped from the conveyor 2 into the chamber 3.

The powdered coal and the catalyst solution are thoroughly stirred and mixed in the impregnating chamber 3 and the mixture then delivered to the upper portion of the reaction chamber 9 by means of the screw conveyor 8. The reaction chamber is heated in any desired manner such as, for example, by hot gases or steam passing through the jacket 10 surrounding the reaction chamber. The reaction chamber 9 is provided near its lower end with an inlet 11 for the introduction of hydrogen and with an outlet 12 in its upper portion for the escape of the gaseous and vaporous reaction products and uncombined hydrogen. In order to insure an efficient intermingling of the hydrogen with the powdered coal being treated, the reaction chamber is provided with baffles 13. The bottom of the reaction chamber is provided with a draw off 14 through which the ash and catalyst are discharged into chamber 15. If a water soluble catalyst has been utilized the chamber 15 may contain water to wash out and recover the catalyst for re-use.

In some cases it may be desirable to utilize a horizontal rotary reaction chamber such as is shown in Fig. 2. In this figure, 19 represents the rotary reaction chamber which is provided with an inlet 11 for the reducing gas such as hydrogen and an outlet 12 for the discharge of the reaction products and any uncombined reducing gas. The powdered, catalyst-impregnated coal is fed into the chamber 19 at its left end by means of a screw conveyor 8 and broken up and gradually passed to the right by means of the screw breaker 20. During its travel through the chamber 19 the coal and reducing gas are subjected to the action of hot gases or other heating means passing through the jacket 10, the spent material such as ash and catalyst being discharged at the right hand end of the chamber through the draw off line 14 into the chamber 15.

Although the use of water-soluble catalysts, and especially of catalysts which remain soluble after passing through the reaction zone, is very convenient, in that it provides a simple method of impregnating the coal with the catalyst and of removing the catalyst from the ash at the end of the reaction, other phosphates may be employed if desired. Such phosphates may for instance be employed in an anhydrous or solid form. Thus they may be finely powdered and added to the coal in the dry state or in suspension in water or other suitable liquid medium, such as heavy oil or the like with which the pulverized coal may, if desired, be mixed to render it more fluid.

It is advantageous to use solutions or suspensions of moderate concentration for the impregnation of the coal, and also to employ a considerable volume of the solution or suspension; frequently the coal may be mixed with about its own weight of liquor, with excellent results. The concentration and volume of liquor employed may be chosen so that the coal retains between 5 and 40%, and especially between 10 and 20% of its weight of catalyst. In general, a lower concentration and larger volume of liquor may be employed in preference to a higher concentration and smaller volume, as by this means a thorough and uniform distribution of the catalyst throughout the coal may be more readily attained.

The coal, impregnated or mixed with the catalyst or with a solution or suspension thereof, may be dried to any desired degree before it is fed into the reaction chamber, but such drying is not essential to the process.

The reaction may conveniently be effected at temperatures such that the coal is substantially completely converted into normally liquid or gaseous products before reaching the discharge end of the apparatus, so that the ash which, mixed with the catalyst, is discharged is practically free from carbonaceous matter. Generally temperatures between about 300° and 400° or 500° C. are very satisfactory, but temperatures outside this range may also be used. The reducing gas is preferably employed under a pressure not substantially different from atmospheric, but higher pressures, for instance pressures of 10–20 atmospheres or pressures up to about 50 or 100 atmospheres, may be employed.

The process may be carried out in any convenient form of reaction vessel or apparatus. Thus, the pulverized coal, if desired in admixture with oil, and containing the catalyst, may be fed into a furnace of the substantially horizontal type, through which it may be caused to travel in any convenient way, for instance by means of a screw conveyor, or by employing a rotating furnace inclined at a small angle to the horizontal. Alternatively, a vertical furnace may be employed, so that the coal is carried down through the furnace by its own weight. The hydrogen or other reducing gases may be introduced at or near the discharge end of the furnace or at various points in the furnace and caused to flow in the opposite direction to that of the travel of the coal. The gases remaining after the reaction, together with gaseous or vaporous products of the reaction, may conveniently be withdrawn from the apparatus near the point of entry of the coal. The furnace may usefully be provided with baffles so arranged as to improve the contact between the coal and the reducing gases. If the conditions are so chosen that the coal is substantially completely converted into gaseous or liquid products, the latter may usefully be removed in vapour form.

For economic working the catalyst is preferably recovered from the ash discharged from the furnace and used again in the process. Thus, for instance, when a water-soluble phosphate or a phosphoric acid remains in the ash, it may be recovered by thoroughly washing the ash with water, and the solution so obtained may be used to impregnate a fresh batch of coal with the catalyst. If the catalyst employed is insoluble in water, or is converted into a water-insoluble form during the reduction of the coal, it may often be dissolved out of the ash with the aid of acids. Other methods may, however, be employed, for example processes making use of differences of specific gravity between the phosphates and the ash.

A very useful application of the invention is the impregnation of the coal with an aqueous solution of an ammonium phosphate, and especially of secondary ammonium phosphate. Under reaction conditions this salt breaks down at least partially to give a mixture of phosphoric acids, mainly metaphosphoric acid, and ammonia, or if desired the coal impregnated with the salt may be heated sufficiently to effect such formation of phosphoric acids before it enters the reaction zone. Whichever method is adopted, the ammonia given off may be recovered, for example by a suitable washing process, and may be caused to re-combine with the phosphoric acids, which, after the reaction, may be obtained from the ash for instance by extraction with water, and thus both ammonia and phosphoric acids may be again employed in the process. If desired, the ammonia may be absorbed in water, and the solution thus obtained may be used directly for the extraction of the phosphoric acids from the ash.

The reaction products, which consist mainly of hydrocarbons which are liquid or gaseous under normal conditions, may be removed from the apparatus in the gas or vapour form, if desired with any reducing gases left undestroyed after their passage in contact with the coal and with gases or vapours derived from oils when such are employed in conjunction with the coal. Such gases or vapours may contain ammonia, for instance, from the nitrogenous substances in the coal and/or from the decomposition of a catalyst comprising an ammonium salt. Preferably after removal of ammonia for example by washing, the reaction products may be condensed or collected in gas holders. If desired the products of the reaction may be subjected to a cracking process either directly or after condensation or other separation or storage. Such cracking may take place in the liquid or vapour phase, and may be caused to produce hydrocarbons of lower molecular weight, and especially to produce olefines such as ethylene and propylene. The cracking may be effected in any convenient way; for example by simple heating of the gases or vapours in presence or absence of inert or diluent gases or vapours such as nitrogen or steam and of catalysts. The heat required for the cracking process may be partly supplied by the sensible heat of the gases or vapours themselves, especially when the latter are cracked substantially immediately after leaving the reaction zone. In such cases ammonia may be removed from the gases or vapours either before or after the cracking process.

As reducing gases for the process of the invention hydrogen, hydrocarbon gases or vapours, especially lower paraffins or other aliphatic hydrocarbons, or carbon monoxide or mixtures containing such gases, such as water gas, town gas, Mond gas, oil gas, producer gas, etc. may be employed. Moreover, part or the whole of the reducing gases may be actually formed in the reaction vessel or apparatus; for example methane and steam may be introduced into the vessel or apparatus under conditions such that interaction takes place with the formation of a mixture comprising hydrogen and carbon monoxide.

The hydrogen or other reducing gases may, if desired, be heated prior to their entry into the reaction vessel or apparatus, for instance by heat exchange with the hot gases and vapours leaving the reaction zone. Moreover, part or all of the heat required for the reaction may be supplied by the incoming reducing gases. The latter may be introduced wholly at or toward the ash discharge end of the apparatus, or at intervals along the whole length or along part of the length of the apparatus, the latter methods being very useful in maintaining or aiding a uniform degree of heating, especially when the reducing gases themselves by their sensible heat content supply a substantial part or the whole of the heat required for the reaction.

The phosphates or phosphoric acids may be employed in conjunction with other substances which are capable of favouring the hydrogenation or reduction of coal to give hydrocarbon oils etc. Thus, for example, the coal may be impregnated with an aqueous solution containing, for example, besides ammonium phosphate or other soluble phosphate or phosphoric acid, ammonium or other soluble molybdate, or other catalysts such as tungstic acid, stannic acid, chromic oxide and chromic acid may be employed. Moreover, the coal may contain or be mixed with iron oxide, for example in amount between 3 and 10% of the weight of the coal.

It is to be understood that the invention is nowise limited to the use as catalyst of any particular product or products that may be formed from the phosphates or phosphoric acids under reaction conditions. Not only is the precise nature of such products very difficult to determine, but the same initial material may give rise to different products under different reaction conditions.

Any type of coal may be employed according to the invention, including lignite and brown coals and other carbonaceous materials such as peat and the like. If desired, the coal, before being subjected to the hydrogenation or reduction and preferably before being impregnated or mixed with the catalyst, may be washed or otherwise treated to reduce its ash content.

The products of the reaction may, if desired or necessary, be treated to remove phenols, for instance, by washing with alkali, or they may be subjected to further treatment to reduce such phenols to hydrocarbons or neutral oils. For instance, they may be subjected to a further treatment with hydrogen or other reducing gases, preferably under atmospheric pressure, and if desired in the presence of catalysts such as molybdic acid or phosphates or phosphoric acid. Such further treatment may advantageously be effected between the main reaction and the cracking in the combined process described above.

The following example illustrates the invention, which is in no way limited thereby.

*Example*

A relatively soft bituminous coal is pulverized and thoroughly mixed with about twice its weight of an 18% aqueous solution of diammonium hydrogen phosphate, and allowed to drain until about ⅓ of the total amount of solution remains in association with the coal. The sludge so obtained is first heated to drive off about half its water content, and is then passed into and through an inclined rotary converter in which it is heated to a temperature in the neighbourhood of 450° C. Hydrogen is led into the converter at the discharge end and the gaseous and vaporous reaction products, together with uncombined hydrogen, are removed from the converter near the point at which the carbonaceous material enters. The materials remaining at the lower end of the converter, which consist mainly of ash containing meta- and/or pyro-phosphoric acids, are discharged and washed thoroughly with a solution of ammonia in water in order to rehydrate the phosphoric acids and to re-form ammonium phosphate. The time taken by the coal to pass through the converter is about 10 hours.

The gases and vapours leaving the converter at the upper end are led rapidly through a further converter comprising a number of comparatively narrow pipes heated to a temperature of about 650° C. The products may be treated for the removal and recovery of ethylene and other olefines in any convenient way.

What I claim and desire to secure by Letters Patent is:—

1. Process for the manufacture of hydrocarbon oils and other substances, which comprises impregnating coal with a liquid medium containing a substance selected from the group consisting of oxyacids of phosphorus and salts of oxyacids of phosphorus, and subsequently subjecting the coal to the action of a reducing gas at an elevated temperature and substantially atmospheric pressure.

2. Process for the manufacture of hydrocarbon oils and other substances, which comprises impregnating coal with an aqueous medium containing a substance selected from the group consisting of oxyacids of phosphorus and salts of oxyacids of phosphorus, the aqueous medium and said substance together being employed in at least an amount of the order of the weight of the coal, and subsequently subjecting the coal to the action of a reducing gas at an elevated temperature and under substantially atmospheric pressure.

3. Process for the manufacture of hydrocarbon oils and other substances, which comprises impregnating coal with an aqueous medium containing a substance selected from the group consisting of oxyacids of phosphorus and salts of oxyacids of phosphorus, and subsequently subjecting the coal to the action of a reducing gas at a temperature between 300° and 500° C. and under substantially atmospheric pressure.

4. Process for the manufacture of hydrocarbon oils and other substances, which comprises impregnating coal with an aqueous medium containing a substance selected from the group consisting of the oxyacids of phosphorus and salts of oxyacids of phosphorus, and subsequently subjecting the coal to the action of a reducing gas at a temperature between 300° and 500° C. and under substantially atmospheric pressure.

5. Process for the manufacture of hydrocarbon oils and other substances, which comprises impregnating coal with an aqueous medium containing a substance selected from the group consisting of the oxyacids of phosphorus and salts of oxyacids of phosphorus, the aqueous medium and the said substance being employed in at least an amount of the order of the weight of the coal, and subsequently subjecting the coal to the action of a reducing gas at a temperature between 300° and 500° C. and under substantially atmospheric pressure.

6. Process for the manufacture of hydrocarbon oils and other substances, which comprises impregnating coal with an aqueous solution of an ammonium phosphate, the water and the ammonium phosphate being employed in at least an amount of the order of the weight of the coal, and subsequently subjecting the coal to the action of a reducing gas at a temperature between 300° and 500° C. and under substantially atmospheric pressure.

HENRY DREYFUS.